Aug. 27, 1940.  C. R. WEISS  2,212,907
MULTIPLE ASSEMBLY ROLLER CHAIN
Filed Dec. 12, 1939  2 Sheets-Sheet 1
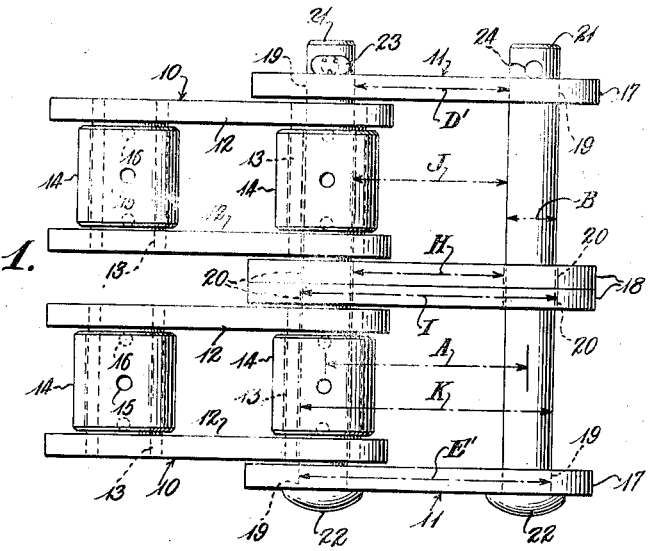
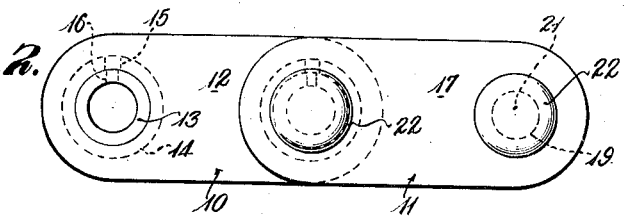
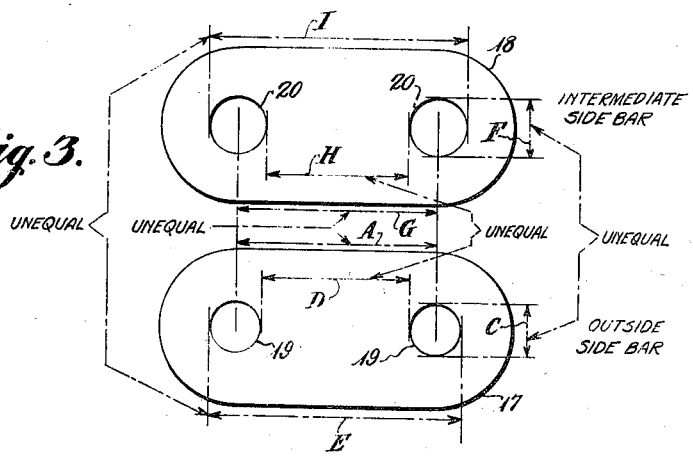
Inventor
Charles R. Weiss Aug. 27, 1940.    C. R. WEISS    2,212,907
MULTIPLE ASSEMBLY ROLLER CHAIN
Filed Dec. 12, 1939    2 Sheets-Sheet 2
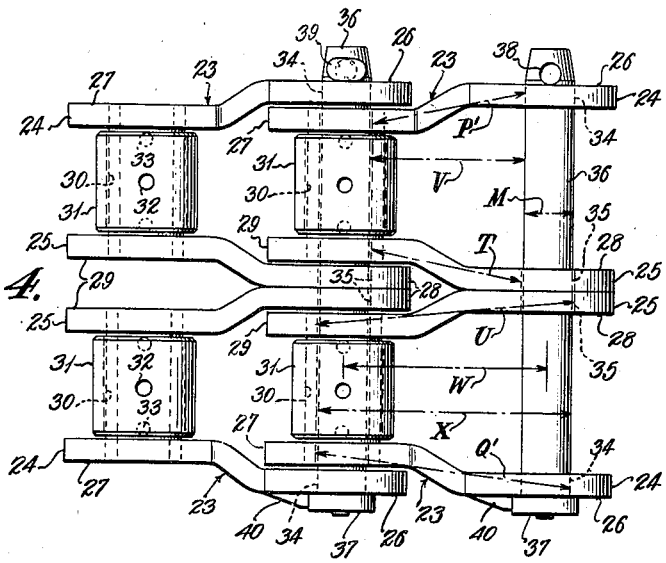
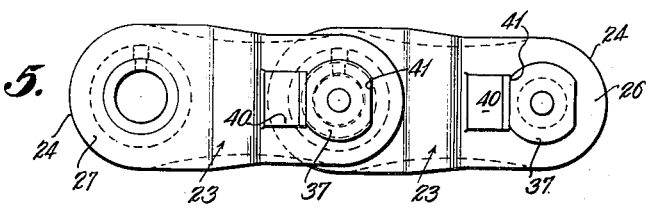
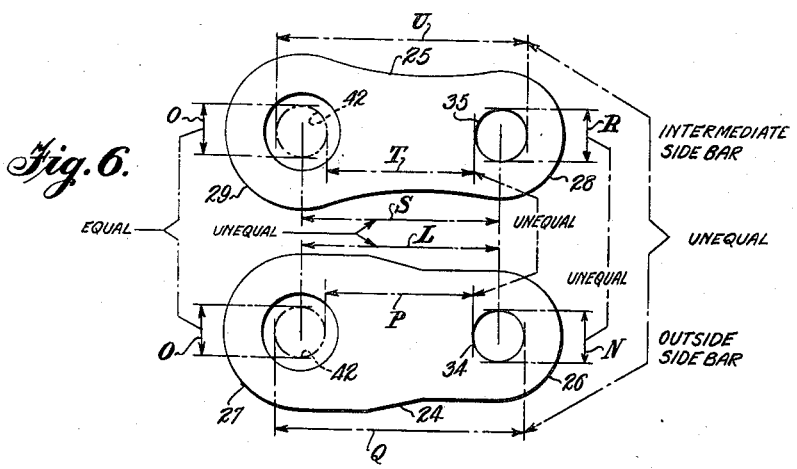
Inventor
Charles R. Weiss Patented Aug. 27, 1940

2,212,907

UNITED STATES PATENT OFFICE 2,212,907

MULTIPLE ASSEMBLY ROLLER CHAIN

Charles R. Weiss, Indianapolis, Ind., assignor to Link-Belt Company, a corporation of Illinois Application December 12, 1939, Serial No. 308,860

5 Claims. (Cl. 74—251)

This invention relates to new and useful improvements in multiple assembly roller chains.

It is the present practice to employ multiple assembly roller chains trained over appropriate sprockets for handling extra heavy loads and loads under installation conditions where clearance allowances will not permit employing single strand roller chains of adequate size and strength. These multiple assembly roller chains in reality are two or more complete assemblies of chain strands arranged in parallel relation with a single set of chain pins, of appropriate lengths, connecting the respective links of each strand and also uniting the several strands.

Multiple assembly roller chains may be made up of links having straight or flat side bars or links having offset side bars. In the type having straight or flat side bars, each strand is made up of inside and outside links with bushings rigidly connecting both ends of each pair of side bars of the inside links and with chain pins connecting both ends of each pair of side bars of the outside links. The chain pins also provide articulated joints between adjacent inside and outside links by passing through the bushings of the inside links. In the type formed of offset links, all links are of similar construction. Each link has an inside or narrow end portion and an outside or wide end portion. The side bars of each link are rigidly connected by a bushing at the inside end portions and are connected by a chain pin at the outside end portions. In both types, the rollers are journaled on the peripheries of the bushings.

In conventional single strand roller chains, the rigid connections between the bushings and their side bars and the connections between the chain pins and their side bars have usually been obtained by employing press fits of substantially uniform tightness. Hydraulic presses, or the like, are employed in carrying out these press fitting operations, as considerable power is required.

Of course, this same practice can be followed in manufacturing multiple assembly roller chains in which event uniform press fit connections first would be produced between the bushing ends and their individual side bar end portions and then, in uniting the adjacent links of each strand and in uniting the parallel strands, the chain pins would be press fitted with a uniform degree of tightness to the side bar pitch holes in which the chain pins are directly received. The power requirements, naturally, would be considerably greater for press fitting the chain pins in multiple assembly chains because each one of the several strands would have two press fit connections for each chain pin. Therefore, in assemblies employing two parallel strands, there would be four press fit connections for each pin.

The practice of employing press fits of uniform tightness in manufacturing multiple assembly chains between the chain pins and the pitch holes of all side bar end portions directly connected to the chain pins, however, presents several objectionable features:

(1) It is extremely difficult to drive or press the pins through the holes of the intermediate side bars.

(2) The cost of these difficult press fitting operations is excessive.

(3) It requires the use of special, heavy pin pushing and extracting equipment in the field when an operator desires to make repairs or to alter the length of a chain assembly.

To overcome the above noted difficulties, it has been proposed to employ press fits between the chain pins and the extreme outside side bar end portions and to employ loose fits, commonly known as "light tap" or "free slip" fits, between the chain pins and the intermediate side bar end portions. Actual use of multiple assembly chains made in this way, however, has shown that new difficulties are encountered which are much more serious because they deal with the operation of the chains while actually in use.

These new and more serious difficulties are as follows:

(1) The load is not equally or uniformly distributed between all of the side bars which are directly connected to the chain pins. The extreme outside side bars, in which the chain pins are press fitted, are called upon to bear a greater portion of the load than is borne by the intermediate side bars, in which the loose fits are provided.

(2) The chain pins are compelled to bend to take up the play or looseness in the pitch holes of the intermediate side bars if any of the load is to be borne by these intermediate side bars. If bending does occur, the pins will be bowed when the chain travels the driving run and the pins will straighten out when traveling through the return run. This repeated bending or bowing and straightening has a very destructive effect on the chain pins.

(3) The bending of the chain pins causes the rollers to cock and bear unevenly on the sprocket teeth with the result that the rollers and teeth are worn unevenly.

It is the primary object of this invention to provide multiple assembly roller chains which may be manufactured without encountering unusual difficulties or incurring excessive costs in assembling the chain pins in the pitch holes of both the outside and intermediate side bar end portions.

Another important object of the invention is to provide a multiple assembly roller chain structure which may be easily repaired, or its length changed, in the field or in users' own shops without requiring the use of special pin pushing and extracting equipment.

A still further important object of the invention is to provide multiple assembly roller chains which are not subject to unbalanced load conditions, pin bending, and uneven wear of rollers and sprocket teeth.

Other objects and advantages of the invention will be apparent during the course of the following description.

In the accompanying drawings forming a part of this specification and in which like numerals are employed to designate like parts throughout the same, Figure 1 is a plan view of a section of a multiple assembly roller chain of the type employing inside and outside links, Figure 2 is a side elevational view of the assembly disclosed in Fig. 1, Figure 3 is a partial exploded view disclosing for comparison one outside and one intermediate chain link side bar, Figure 4 is a view similar to Fig. 1 but illustrates the invention applied to a multiple assembly roller chain made up of strands of offset links, Figure 5 is a side elevational view of the structure disclosed in Fig. 4, and Figure 6 is a partial exploded view disclosing for comparison an outside and an intermediate side bar.

In the drawings, wherein for the purpose of illustration are shown the preferred embodiments of this invention, and particularly referring to Fig. 1, there is disclosed a multiple assembly roller chain which is made up of two complete strands. Each strand includes inside links 10 and outside links 11. The inside links 10 are formed of side bars 12 which are rigidly connected at their opposite end portions by bushings 13 which are press fitted at their opposite ends in appropriate holes formed in the end portions of the side bars. A roller 14 is journaled on each bushing. Intermediate its ends, each roller is provided with an aperture 15 through which lubricant may be fed to lubricate the contacting surfaces of the roller 14 and the bushing 13. Apertures 16 are formed in the end portions of the bushings 13 to allow lubricant to be applied to the bores of the bushings in which the chain pins are received.

The outside links 11 are formed of side bars 17 and 18. The end portions of these side bars are provided with pitch holes 19 and 20, respectively. Chain pins 21 are employed for completing the articulated joints between the inside and outside links. These pins pass through the pitch holes 19 and 20 of the side bar end portions of the side bars 17 and 18 and through the bores of the bushings 13. These pins may take any desired form, but they are illustrated in Fig. 1 as having one headed end 22 and as having a cotter pin, or the like, 23 passing through an aperture 24 formed in the remaining end. It will be noted in this assembly that although two complete strands of chain links are employed, only one set of chain pins is necessary.

As has been pointed out above, in a single strand chain of inside and outside links, it is customary to provide a press fit between each chain pin and both of the pitch holes formed in the end portions of the side bars. If this practice were carried out in the assembly of a multiple strand chain of the type disclosed in Fig. 1, it would be necessary to provide press fits between each chain pin 21 and the four pitch holes 19 and 20 formed in the end portions of the outside and intermediate side bars 17 and 18, respectively. These four press fits would be extremely costly and difficult even when performed in the manufacturer's own plant. These four press fits would render repairs, etc., made in the field or in a user's shop practically prohibitive unless special, heavy pin pushing and extracting machines were provided.

In endeavoring to overcome these assembly and repair problems, involving the four press fits for each chain pin, it was decided to try out the idea of retaining the press fits between the chain pins and the pitch holes 19 of the extreme outside side plates 17 and to provide loose fits between the chain pins and the pitch holes 20 of the intermediate side bars 18. This practice completely overcame the assembly and repair problems. It was discovered, however, that the side bars 17 were carrying practically the entire load in the outside links 11. The intermediate side bars 18 were either not carrying any load or the chain pins 21 were compelled to bend or bow to cause their peripheries to engage the outer side walls of the pitch holes 20. As this produced an operating defect which was extremely serious, this plan has had to be abandoned.

This invention involves a different, and what has been found to be a complete, solution for the entire problem. In the present construction, press fits are still provided between the chain pins 21 and the pitch holes 19 in the outside side bars 17. Loose fits, or what are better known as "light tap" or "free slip" fits are provided between the chain pins and the pitch holes 20 of the intermediate side bars 18. To compel these intermediate side bars 18 to carry their full share of the load, or a portion of the load equal to that borne by the outside side bars 17, the oversize pitch holes 20 are displaced longitudinally inwardly of the length of the intermediate side bars 18. In other words, the pitch holes 20 are eccentrically arranged with respect to the chain pins 21 and this eccentric positioning is obtained by shortening the pitch or the distance between the axes of the pitch holes 20 for each intermediate side bar 18. This shortening of the pitch or the distance between the pitch hole axes should be sufficient to place the outer side wall portion of each pitch hole 20 in direct contact with the adjacent periphery of its chain pin. Therefore, the pitch of the two pitch holes 20 of a given side bar 18 is shortened an amount equal to the difference between the radii of the chain pins and the pitch holes 20 of each intermediate side bar 18. In other words, where two chain pins and two pitch holes 20 are involved with each intermediate side bar 18, the pitch for the pitch holes 20 should be reduced an amount which is equal to the sum of the differences between the radii of both chain pins and the radii of both pitch holes 20. To express this formula in a different way, where two chain pins and two pitch holes are involved, the pitch of the pitch holes should be reduced an amount equal to the total difference in diameter between one chain pin and its pitch hole. Where only one chain pin and pitch hole is involved, as will be the case for the offset links of Figs. 4 to 6, inclusive, the pitch between pitch holes should be reduced an amount equal to one-half the difference between the diameter of one chain pin and the diameter of one pitch hole.

This shortening of the pitch of the intermediate side bars 18 will clearly place the outside surfaces of the pitch holes 20 in engagement with the chain pins 21 while these chain pins remain straight. The intermediate side bars 18 then will carry the same proportion of the load as the outside side bars 17 and yet the chain pins 21 may be easily passed through the pitch holes 20. The press fitting operation of each one of these chain pins 21, therefore, will be no greater than the press fitting operation performed for any single strand chain.

It is believed that this modification or shortening of the pitch or position of the pitch holes 20 relative to the pitch or positioning of the pitch holes 19 can be more fully and more clearly explained by applying specific dimensions to the disclosure of side plates 17 and 18 in Fig. 3. The dimensions which will be applied to the side bars of this figure will be appropriate for a chain of one pitch only. It will be appreciated, therefore, that these specific figures are not given for the purpose of limiting the invention to one critical set of dimensions. The figures or dimensions will vary as the pitch of the chain varies.

As the side bar 17 is the bar of normal construction, its pitch, or difference between pitch hole axes, indicated by the dimension line A, corresponds with the normal link pitch for the chain, or the distance between the axes of the two chain pins 21. In the example of dimensions to be specifically presented, this pitch or dimension A is 3.117 inches. It will be noted that the same dimension lines also have been applied to the disclosure of Fig. 1. Dimension line A, therefore, appears therein. In this latter figure, however, it is applied to the dimension or distance between chain pin axes. The diameter of each chain pin 21 is represented by the dimension line B in Fig. 1. This diameter is .802 inch. As a press fit is to be provided between the chain pin 21 and its respective pitch hole 19 of the side bar 17, the diameter of each pitch hole 19 must be less than the diameter of the chain pin. This diameter is represented by the dimension line C and is .800 inch. The chain pin diameter, therefore, is .002 inch larger than the diameter of the pitch hole 19, and this difference provides the press fit desired. From these two dimensions A and C, we can readily arrive at the dimensions represented by the lines D and E or the distances between the two inner sides and the two outer sides of the pitch holes 19. The dimension D will be 2.317 inches. The dimension E will be 3.917 inches. Fig. 1 discloses dimension lines D' and E' instead of the dimension lines D and E of Fig. 3. These different reference characters have been employed because there will be a difference in the inside and outside dimensions of the two pitch holes 19 after a side bar 17 is built into a chain assembly. This difference results from the press fitting of chain pins in the pitch holes 19. In other words, as each chain pin is .002 inch larger in diameter than its pitch hole 19, this .002 must be taken care of in some way. In actual practice, the chain pin is compressed or reduced in diameter to take care of a portion of this difference and the pitch hole 19 is expanded or increased in diameter to take care of the remainder of the difference. For our purposes, however, we shall consider that the chain pin diameter remains constant and the pitch hole is expanded sufficiently to take care of the entire .002 inch difference. With this variation in dimensions in mind, the dimension line D' will measure 2.315 inches while dimension line E' will measure 3.919 inches.

Let us now consider the specific dimensions for the intermediate side bar 18. It has been explained above that the diameters of the pitch holes 20 are to be sufficiently greater than the diameter of the chain pin 21, or dimension B, to provide a loose fit between these pitch holes 20 and their respective chain pins; an appropriate difference in dimension will be for the pitch holes 20 to each measure .806 inch. Dimension line F represents the diameter of each pitch hole 20. This diameter allows .004 inch clearance between the periphery of a chain pin and the internal diameter of its pitch hole 20. If a chain pin is centered in a pitch hole 20, there will be a clearance of .002 inch at any point around the periphery of the chain pin. To move each pitch hole 20 inwardly, longitudinally of the side bar 18 sufficiently to cause the outer side of the pitch hole side wall to engage the periphery of the chain pin will require the pitch hole to be moved .002 inch. Therefore, both pitch holes 20 of side bar 18 will be moved toward each other a distance of .004 inch. Dimension line G, therefore, represents the link pitch of the intermediate side bar, or the distance between the axes of the two pitch holes 20. This dimension will be 3.113 inches. Having this dimension G and the dimension F, we can readily calculate the dimensions represented by lines H and I. The dimension H is 2.307 inches. Dimension I is 3.919 inches. Fig. 1 discloses two additional dimension lines J and K which designate the distances between the two inner sides and the two outer sides, respectively, of adjacent chain pins 21. These dimensions will correspond with dimensions D' and E', respectively or 2.315 inches for dimension line J and 3.919 inches for dimension line K.

A summary of the dimensions represented by lines A to K, inclusive, are set forth in the following Schedule 1:

|   | Inches |   | Inches |
|---|---|---|---|
| A | 3.117 | F | .806 |
| B | .802 | G | 3.113 |
| C | .800 | H | 2.307 |
| D | 2.317 | I | 3.919 |
| E | 3.917 | J | 2.315 |
| D' | 2.315 | K | 3.919 |
| E' | 3.919 |   |   |

Referring now to the form of chain disclosed in Figs. 4 to 6, inclusive, and specifically to the disclosure of Fig. 4, it will be seen that this multiple assembly chain is made up of two strands with each strand formed entirely of offset links 23. Each one of these links is made up of side bars 24 and 25. Each side bar 24 includes an outside end portion 26 and an inside end portion 27. Each side bar 25 consists of an outside end portion 28 and an inside end portion 29.

The inside end portions 27 and 29 of each link are joined by bushings 30 which are press fitted in suitable holes at their opposite ends. Each bushing 30 has journaled thereon a roller 31. Intermediate its ends, each roller is provided with an aperture 32 through which lubricant may be introduced to lubricate the contacting surfaces of the roller and its bushing. Each bushing 30 has an aperture 33 formed in each end portion to allow for the passage of lubricant to lubricate the bore of the bushing and the periphery of the chain pin which passes therethrough.

The outside side bar end portions 26 have pitch holes 34 formed therein. The outside side bar end portions 28 have pitch holes 35 formed therein. These pitch holes allow for the passage of chain pins 36 which also pass through the bores of the bushings 30 to unite the parallel chain strands and to unite the adjacent links of each strand to provide articulated joints between all adjacent links of the respective strands. These chain pins may be of any desired construction but are illustrated as being headed at the end 37 and as having an aperture 38 formed in the remaining end to receive a cotter pin, or the like, 39. Lugs 40 may be formed on the side bar end portions 26 to engage flat sides 41 of the pin heads to prevent rotation of the pins.

In this arrangement, it will be seen that each side bar of each chain link will be provided with a pitch hole at one end through which a chain pin directly passes. It is the outside end portion of each side bar which has the chain pin receiving pitch hole formed therein. As there are four such outside side bar end portions for each complete chain joint, it will be as impractical in this type of chain to provide press fits between the chains and all of the pitch holes directly receiving the same as it was with the chain structure disclosed in Figs. 1 to 3, inclusive. Therefore, the extreme outside end portions 26 of a complete joint will be provided with pitch holes 34 of a diameter to provide a press fit for the chain pin. The pitch holes 35 for the side bar end portions 28 will be of a diameter which will provide a loose fit with the chain pin. These side bar end portions 28 are the intermediate end portions of this assembly and correspond with the intermediate side bars 18 of the assembly shown in Figs. 1 to 3, inclusive.

It has been explained that the remaining end portions 27 and 29 of the side bars for each link are connected to the opposite ends of bushings so that these end portions are not press fitted on a chain pin or do not provide pitch holes for the reception of a chain pin. Therefore, to cause the outside side walls of the pitch holes 35 to directly engage or bear against the adjacent portion of the periphery of the chain pin, it only becomes necessary to displace the pitch holes 35 inwardly a distance which corresponds with the difference between the radius of the chain pin 36 and the radius of each pitch hole 35. Expressed in another way, the pitch holes 35 will have to be displaced longitudinally inwardly of their side bar end portions a distance equal to one-half the difference between the diameter of the chain pin 36 and the diameter of a pitch hole 35. The pitch of the side bars 25, therefore, will be shorter than the pitch of the side bars 24 by a distance equal to one-half the difference between the diameter of the chain pin 36 and the diameter of a pitch hole 35.

This change in pitch of the side bars 25 also will be explained in connection with the disclosure of Fig. 6 in which a comparison of dimensions is made between one side bar 24 and one side bar 25. In applying actual values to the several dimension lines disclosed in Figs. 4 and 6, it will be understood that these values apply only to a chain with a given pitch and that chains having different pitches will have different dimensions. The dimensions which are given, therefore, are not intended to in any way limit the scope of the invention.

The side bar 24 disclosed in Fig. 6 is illustrated as having a pitch hole 34 formed in its outside end portion 26 while the dotted circle 42 is intended to represent the periphery of a chain pin passing through the bushing connected to the inside end portions 27 of the side bar. As this extreme outside side bar 26 determines the pitch of the chain links, the dimension line L represents the link pitch. Assume that this pitch is the same as that of the chain disclosed in Figs. 1 to 3, inclusive, or 3.117 inches. Dimension line M in Fig. 4 represents the diameter of the chain pin 36 which is .802 inch. As the pitch hole 34 is to provide a press fit for the chain pin 36, the diameter of this pitch hole should be less than the diameter of the chain pin. The dimension line N represents the diameter of this pitch hole 34. This diameter is .800 inch. The difference in diameter between the pitch hole 34 and the chain pin 36, therefore, is .002 inch. The dotted circle 42, as has been explained above, represents the diameter of a chain pin, and for that reason the diameter represented by dimension line O is .802 inch. With these dimensions L, N, and O given, it is not difficult to calculate the dimensions represented by lines P and Q. The dimension of line P is 2.316 inches. The dimension of line Q is 3.918 inches. Fig. 4 discloses dimension lines P' and Q' which differ from dimension lines P and Q of Fig. 6 because of the change in diameter of the pitch holes 34 as a result of press fitting the chain pin 36 therein. The dimension of line P' is 2.315 inches. The dimension of line Q' is 3.919 inches.

The intermediate side bar 25 has a side bar end portion 28 formed with a pitch hole 35. The remaining end portion 29 of this side bar 25 is provided with a dotted circle line 42 which represents the diameter of a chain pin passing through the bore of the bushing connected to this end portion of the side bar. The diameter of the pitch hole 35 is represented by the line R, and this dimension is .806 inch. The dimension line O represents the diameter of the chain pin and is the same as the dimension line O of the side bar 24.

As the pitch hole 35 is to be moved longitudinally inwardly of the side bar 25 a sufficient distance to cause the outer portion of the side wall of this pitch hole to directly bear against the periphery of the chain pin loosely fitted therein, the pitch hole 35 should be displaced longitudinally inwardly a distance corresponding to one-half the difference between the diameter of the pitch hole 35 and the diameter of the chain pin 36. This pitch hole 35, therefore, is displaced longitudinally inwardly .002 inch.

The dimension line S, therefore, represents the link pitch of the side bar 25, and this pitch is 3.115 inches. With dimensions O, R, and S given, it is not difficult to calculate dimensions T and U. These dimensions are 2.311 inches for line T and 3.919 inches for line U.

It should be understood that dimension lines P', Q', T, and U are applied diagonally to side bars 24 and 25 in Fig. 4 only for the sake of clearness, or so as to correspond more closely with the application of similar dimension lines in Fig. 1. The dimensions represented by these diagonal lines, however, are not diagonal dimensions.

Fig. 4 has thereon three additional dimension lines which apply to the two adjacent chain pins. Dimension line V represents the distance between the inner sides of the two pins and this is 2.315 inches. Dimension line W represents the distance between the axes of the two pins, and this dimension is 3.117 inches, or the pitch of the chain link. Dimension line X represents the distance between the outer sides of the adjacent pins, and this distance is 3.919 inches.

To summarize the dimensions represented by lines L to X, inclusive, Schedule 2 will be set forth below:

|   | Inches |   | Inches |
|---|---|---|---|
| L | 3.117 | R | .806 |
| M | .802 | S | 3.115 |
| N | .800 | T | 2.311 |
| O | .802 | U | 3.919 |
| P | 2.316 | V | 2.315 |
| Q | 3.918 | W | 3.117 |
| P' | 2.315 | X | 3.919 |
| Q' | 3.919 |   |   |

Although the drawings disclose multiple assembly roller chains which include only two parallel strands of links for each assembly, it will be understood that the assembly may as well include three or more parallel strands of chain links. In fact, multiple assembly chains including three strands are used almost as extensively as multiple assembly chains which include two strands. When three strands of chain links are employed, the chain pins are press fitted only to the extreme outside side bar end portions and loose fits are provided between the chain pin and the pitch holes of all of the intermediate side bar end portions. The same would be true with four or more strands of links assembled in a single chain structure.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:

1. Multiple assembly roller chains, comprising a plurality of parallel strands of links connected by joints with each link in each strand including two side bars, each complete joint arrangement for the entire width of the assembly comprising a pair of side bar end portions for each strand connected by a bushing, a second pair of side bar end portions for each strand having pitch holes for the passage of a chain pin with the end portions positioned so that the bushing connected side bar end portions of the strand will lie therebetween, said positioning causing side bar end portions, which have pitch holes, to lie intermediate the ends of the bushings of adjacent strands and also causing one of the side bar end portions, which has a pitch hole, to act as each extreme outside side bar end portion of the complete joint arrangement, and a single chain pin extending through all of the bushing bores and the pitch holes of the complete joint arrangement; the diameters of the respective pitch holes of a joint being such as to provide a press fit between the chain pin and each extreme outside side bar end portion and a loose fit between the chain pin and each intermediate side bar end portion, the pitch holes for the intermediate side bar end portions, having the loose fits, being eccentrically positioned with respect to the axis of the chain pin so that the side wall portions of the pitch holes lying closest to the ends of the side bars will bear against the chain pin to equalize the load borne by the intermediate and extreme outside side bars.

2. Multiple assembly roller chains, comprising a plurality of parallel strands of links connected by joints with each link in each strand including two side bars, each complete joint arrangement for the entire width of the assembly comprising a pair of side bar end portions for each strand connected by a bushing, a second pair of side bar end portions for each strand having pitch holes for the passage of a chain pin with the end portions positioned so that the bushing connected by the bar end portions of the strand will lie therebetween, said positioning causing side bar end portions, which have pitch holes, to lie intermediate the ends of the bushings of adjacent strands and also causing one of the side bar end portions, which has a pitch hole, to act as each extreme outside side bar end portion of the complete joint arrangement, and a single chain pin extending through all of the bushing bores and the pitch holes of the complete joint arrangement; the diameters of the respective pitch holes of a joint being such as to provide a press fit between the chain pin and each extreme outside side bar end portion and a loose fit between the chain pin and each intermediate side bar end portion, the pitch of the side bars of a chain assembly having end portions loosely fitted to chain pins being shortened relative to the normal pitch, or distance between adjacent chain pin axes, an amount which will cause the side wall portions of the loosely fitted pitch holes lying closest to the ends of the side bars to bear against the chain pins to balance the load borne by all of the chain link side bars.

3. A complete joint structure for a multiple strand roller chain assembly comprising two inside and two outside chain link side bar end portions for each chain strand with the inside and outside end portions arranged in overlapping pairs, a bushing connecting the inside side bar end portions of each strand, the outside side bar end portions of parallel strands having pitch holes and being arranged to form the two intermediate end portions and the two extreme outside end portions of the complete joint structure, and a single chain pin extending through all of the bushing bores and the pitch holes of the complete joint structure, the diameters of the respective pitch holes of a joint being such as to provide a press fit between the chain pin and each extreme outside side bar end portion and a loose fit between the chain pin and each intermediate side bar end portion, the pitch holes for the intermediate side bar end portions, having the loose fit, being eccentrically positioned with respect to the axis of the chain pin so that the side wall portions of the pitch holes lying closest to the ends of the side bars will bear against the chain pin to equalize the load borne by the intermediate and extreme outside side bars.

4. Multiple assembly roller chains, comprising a plurality of parallel strands of alternately arranged inside and outside links, each including a pair of side bars, connected by joints with the inside and the outside links of the parallel strands being aligned transversely of the assembly whereby one side bar of each outside link will lie intermediate the inside links of the parallel strands and the other side bar of each outside link will lie on an extreme outside of the assembly, a bushing connecting both the ends of each pair of side bars for each inside link, each end of each side bar of the outside links having a pitch hole formed therein, and a single chain pin passing through all of the bushings and the pitch holes at each joint; the diameters of the respective pitch holes of each joint being such as to provide a press fit between the chain pin and the pitch holes of the extreme outside side bars of the assembly and a loose fit between the chain pin and the pitch holes of the intermediate side bars of the assembly, the pitch of all of the said intermediate side bars of the outside links, which have loose fits with the chain pins, being shortened relative to the pitch of the extreme outside side bars of the outside links an amount which will cause the side wall portions of the loosely fitted pitch holes lying closest to the ends of the side bars to bear against the chain pins to balance the load borne by all of the chain link side bars.

5. Multiple assembly roller chains, comprising a plurality of parallel strands of offset links connected by joints and with the links of the respective strands transversely aligned, each link of each strand comprising two side bars arranged to provide two inside side bar end portions and two outside side bar end portions with a bushing connecting the two inside side bar end portions and a pitch hole formed in each outside side bar end portion, one outside side bar end portion of each link lying intermediate the inside side bar end portions of the next adjacent two links at each joint, and the other outside side bar end portion lying on the extreme outside of said joint, and a single chain pin passing through all of the bushings and the pitch holes at each joint; the diameters of the respective pitch holes of each joint being such as to provide a press fit between the chain pin and the pitch holes of the extreme outside side bar end portions of the assembly and a loose fit between the chain pin and the pitch holes of the intermediate side bar end portions of the assembly, the pitch of all of the said intermediate side bars, which have loose fits with the chain pins, being shortened relative to the pitch of the extreme outside side bars an amount which will cause the side wall portions of the loosely fitted pitch holes lying closest to the ends of the side bars to bear against the chain pins to balance the load borne by all of the chain link side bars.

CHARLES R. WEISS.